(12) United States Patent
Huang

(10) Patent No.: US 11,171,633 B2
(45) Date of Patent: Nov. 9, 2021

(54) CIRCUIT FOR GENERATING PROTECTION SIGNAL AND PROTECTION APPARATUS

(71) Applicant: HKC CORPORATION LIMITED, Shenzhen (CN)

(72) Inventor: Xiaoyu Huang, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 17/264,315

(22) PCT Filed: Jan. 9, 2019

(86) PCT No.: PCT/CN2019/070988
§ 371 (c)(1),
(2) Date: Jan. 29, 2021

(87) PCT Pub. No.: WO2020/103322
PCT Pub. Date: May 28, 2020

(65) Prior Publication Data
US 2021/0297067 A1    Sep. 23, 2021

(30) Foreign Application Priority Data
Nov. 20, 2018  (CN) .......................... 201811384860.4

(51) Int. Cl.
*H03K 3/037* (2006.01)
*G11C 7/22* (2006.01)
(Continued)

(52) U.S. Cl.
CPC ............. *H03K 3/037* (2013.01); *G06F 21/79* (2013.01); *G11C 7/222* (2013.01); *G09G 3/3648* (2013.01)

(58) Field of Classification Search
None
See application file for complete search history.

(56) References Cited

U.S. PATENT DOCUMENTS 5,442,310 A  *  8/1995  Bazes ........................ G06F 1/24
                                                          327/143
7,746,329 B2     6/2010  Kim et al.
(Continued)

FOREIGN PATENT DOCUMENTS

CN      101635569 A     1/2010
CN      102158347 A     8/2011
(Continued)

*Primary Examiner* — Cassandra F Cox
(74) *Attorney, Agent, or Firm* — Bayramoglu Law Offices LLC

(57) ABSTRACT

A circuit for generating a protection signal and a protection apparatus are provided. The circuit includes: a first flip flop, wherein the first flip flop is configured for receiving an enabling signal and an external signal input to the first flip flop and outputting a first level according to the enabling signal and the external signal; a second flip flop, wherein the second flip flop is in connection with the first flip flop and the second flip flop is configured for outputting a protection signal according to the first level and the external signal; and a feedback device, wherein the feedback device is connected between an output terminal of the second flip flop and an input terminal of the first flip flop and the feedback device is configured for outputting the enabling signal.

17 Claims, 2 Drawing Sheets

(51) Int. Cl.
*G06F 21/79* (2013.01)
*G09G 3/36* (2006.01)

(56) References Cited

U.S. PATENT DOCUMENTS

| | | | |
|---|---|---|---|
| 8,508,454 | B2 | 8/2013 | Hui et al. |
| 2012/0027073 | A1 | 2/2012 | Abel et al. |

FOREIGN PATENT DOCUMENTS

| | | |
|---|---|---|
| CN | 103607184 A | 2/2014 |
| CN | 104282282 A | 1/2015 |
| CN | 204423919 U | 6/2015 |
| CN | 105191127 A | 12/2015 |
| CN | 106374898 A | 2/2017 |
| CN | 107871482 A | 4/2018 |

\* cited by examiner

CIRCUIT FOR GENERATING PROTECTION SIGNAL AND PROTECTION APPARATUS

CROSS REFERENCE TO THE RELATED APPLICATIONS

This application is the national stage entry of International Application No. PCT/CN2019/070988, filed on Jan. 9, 2019, which is based upon and claims priority to Chinese Patent Application No. 201811384860.4, filed on Nov. 20, 2018, the entire contents of which are incorporated herein by reference.

TECHNICAL FIELD

The present application relates to the field of storage technology, and more particularly to a circuit for generating a protection signal and a protection apparatus.

BACKGROUND

The statements here only provide background information related to this application, and do not necessarily constitute prior art.

A thin film transistor liquid crystal display (TFT-LCD) is one of the main types of current flat panel displays, and has become an important display platform in modern IT and video products. The main driving principle of the thin film transistor display device is as follows: a system main board is connected to a connector of a printed circuit board (PCB) via wires for transmitting a R/G/B compression signal, a control signal, and a power, after being processed by a timing controller on the PCB, such data are transmitted from the PCB to a display region through a source-chip on film and a gate-chip on film, enabling the display apparatus to obtain required power and signals. There are multiple chips on the circuit board that require software writing. To prevent erroneous software writing, a protection signal is required. The current protection signal is logically controlled by directly inputting high/low levels from the outside. When the machine is set incorrectly or interfered by the outside, the software has the risk of being rewritten.

SUMMARY

It is an objective of the present application to provide a circuit for generating a protection signal, which aims at solving the problem including but not limited to that the software data in the chip has the risk of being rewritten when the machine is incorrectly set or is interfered by the outside.

In view of this, technical solutions according to embodiments of the present application are as follows:

A circuit for generating a protection signal is provided. The circuit for generating a protection signal comprises:
a first flip flop, configured for receiving an enabling signal and an external signal input thereto and outputting a first level according to the enabling signal and the external signal;
a second flip flop, being in connection with the first flip flop and configured for outputting a protection signal according to the first level and a preset change in the external signal; and
a feedback device, being connected between an output terminal of the second flip flop and an input terminal of the first flip flop and configured for outputting the enabling signal.

In an embodiment, the external signal is periodically changing high and low level signals.

In an embodiment, the first flip flop is a rising-edge-triggered D flip-flop, and the second flip flop is a falling-edge-triggered D flip-flop. When the external signal received by the control terminal of the first flip flop is at a rising edge, a logic level of the input terminal of the first flip flop is assigned to the output terminal of the first flip flop. When the external signal received by the control terminal of the second flip flop is at a falling edge, a logic level of the input terminal of the second flip flop is assigned to the output terminal of the second flip flop.

In an embodiment, the feedback device comprises: a first switch tube and a second switch tube; and the first switch tube and the second switch tube are connected between a logic high level and a logic low level.

In an embodiment, the first switch tube is a P-type insulated gate field effect tube, and the second switch tube is an N-type insulated gate field effect tube. A source of the first switch tube is in connection with the logic high level, a source of the second switch tube is in connection with the logic low level, a gate of the first switch tube and a gate of the second switch tube are both in connection with the output terminal of the second flip flop, and a drain of the first switch tube and a drain of the second switch tube are both in connection with the input terminal of the first flip flop.

In an embodiment, the protection signal is a level signal.

In an embodiment, the circuit for generating the protection signal further comprises: a first grounding resistor and a second grounding resistor. The first grounding resistor is connected between the input terminal of the first flip flop and a ground, and the second grounding resistor is connected between the control terminal of the first flip flop and the ground.

In an embodiment, the enabling signal is a level signal; and in the absence of inputting the external signal, the enabling signal is at a low level.

It is another objective of the present application to provide a protection apparatus. The protection apparatus is in connection with a memory chip and comprises:
a first flip flop, configured for receiving an enabling signal and an external signal input thereto and outputting a first level according to the enabling signal and the external signal;
a second flip flop, being in connection with the first flip flop and configured for outputting a protection signal according to the first level and a preset change of the external signal; and
a feedback device, being connected between an output terminal of the second flip flop and an input terminal of the first flip flop and configured for outputting the enabling signal.

The memory chip is configured for receiving the protection signal and controlling writing and reading of data according to the protection signal.

In an embodiment, the external signal is periodically changing high and low level signals.

In an embodiment, the first flip flop is a rising-edge-triggered D flip-flop, and the second flip flop is a falling-edge-triggered D flip-flop. When the external signal received by the control terminal of the first flip flop is at a rising edge, a logic level of the input terminal of the first flip flop is assigned to the output terminal of the first flip flop. When the external signal received by the control terminal of the second flip flop is at a falling edge, a logic level of the input terminal of the second flip flop is assigned to the output terminal of the second flip flop.

In an embodiment, the feedback device comprises: a first switch tube and a second switch tube. The first switch tube and the second switch tube are connected between a logic high level and a logic low level.

In an embodiment, the first switch tube is a P-type insulated gate field effect tube, and the second switch tube is an N-type insulated gate field effect tube. A source of the first switch tube is in connection with the logic high level, a source of the second switch tube is in connection with the logic low level, a gate of the first switch tube and a gate of the second switch tube are both in connection with the output terminal of the second flip flop, and a drain of the first switch tube and a drain of the second switch tube are both in connection with the input terminal of the first flip flop.

In an embodiment, the protection signal is a level signal.

In an embodiment, the protection apparatus further comprises: a first grounding resistor and a second grounding resistor. The first grounding resistor is connected between the input terminal of the first flip flop and a ground, and the second grounding resistor is connected between the control terminal of the first flip flop and the ground.

In an embodiment, the enabling signal is a level signal; and in the absence of inputting the external signal, the enabling signal is at a low level.

It is still another embodiment of the present application to provide a circuit for generating a protection signal. The circuit for generating a protection signal comprises:

a first flip flop, configured for receiving an enabling signal and an external signal input thereto and outputting a first level according to the enabling signal and the external signal;

a second flip flop, being in connection with the first flip flop and configured for outputting a protection signal according to the first level and a preset change of the external signal; and a feedback device, being connected between an output terminal of the second flip flop and an input terminal of the first flip flop and configured for outputting the enabling signal.

The first flip flop is a rising-edge-triggered D flip-flop, and the second flip flop is a falling-edge-triggered D flip-flop. When the external signal received by the control terminal of the first flip flop is at a rising edge, a logic level of the input terminal of the first flip flop is assigned to the output terminal of the first flip flop. When the external signal received by the control terminal of the second flip flop is at a falling edge, a logic level of the input terminal of the second flip flop is assigned to the output terminal of the second flip flop. When a number of rising edges and falling edges of the external signal is an even number, the protection signal is at a high level, and the external signal allows data writing or reading.

In the circuit for generating the protection signal provided by embodiments of the present application, by detecting the preset level change of the external signal, the output level of the protection signal is determined, thereby controlling the signal writing into the chip, preventing the misoperation and the external interference from changing the protection signal, and avoiding the risk of soft rewriting.

BRIEF DESCRIPTION OF THE DRAWINGS

In order to more clearly illustrate the technical solutions in the embodiments of the present application, the drawings that need to be used in the description of the embodiments or the exemplary art will be briefly described hereinbelow. Obviously, the accompanying drawings in the following description are only some embodiments of the present application. For those skilled in the art, other drawings can be obtained based on these drawings without creative work.

Reference numbers are indicated as follows: WP_O: Protection signal; 10: First flip flop 20: Second flip flop 30: Feedback device E: Enabling signal F: External signal; M1: First switch tube; M2: Second switch tube; R1: First grounding resistor; R2: Second grounding resistor; GND: Grounded terminal; and VDD: External power supply.

DETAILED DESCRIPTION OF THE EMBODIMENTS

Figure 1:
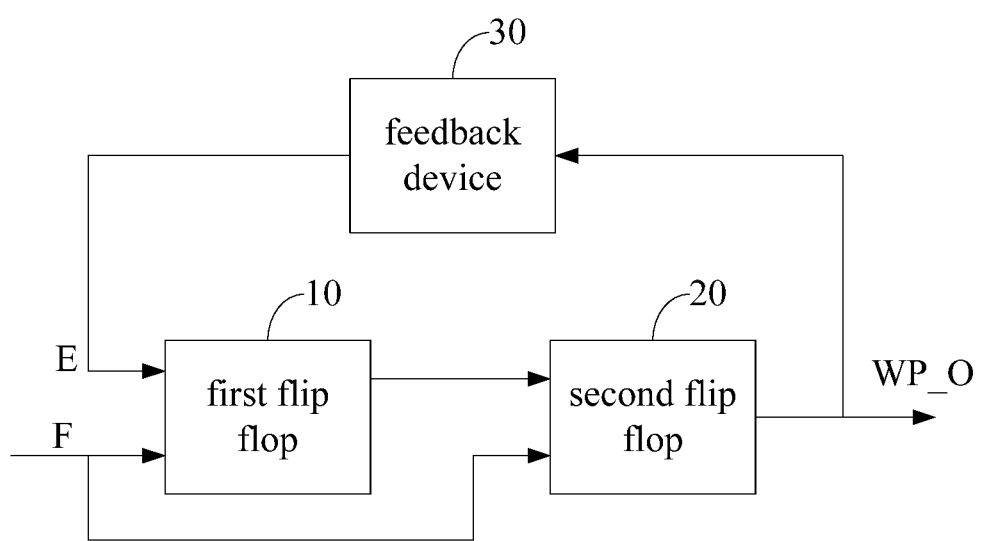
FIG. 1 is a structure diagram of a circuit for generating a protection signal provided by an embodiment of the present application.

In order to make the purpose, technical solutions, and advantages of the present application clearer, the present application will be further described in details in combination with the accompanying drawings and embodiments. It should be understood that the specific embodiments described here are only used to explain the present application, and are not used to limit the present application.

It should be noted that when a component is said to be "fixed on" or "installed on" another component, it can be directly or indirectly on the other component. When a component is said to be "connected" to another component, it can be directly or indirectly connected to the other component. The terms "upper", "lower", "left", "right", etc. indicate the orientation or positional relationship based on the orientation or positional relationship shown in the drawings, and are only for ease of description, and do not indicate or imply the device referred to or the element must have a specific orientation, and be constructed and operated in a specific orientation, and therefore cannot be construed as a limitation of the present application. For those skilled in the art, the specific meaning of the above terms can be understood according to specific conditions. The terms "first" and "second" are only used for ease of description, and cannot be understood as indicating or implying relative importance or implicitly indicating the number of technical features. The meaning of "plurality" means two or more than two, unless otherwise specifically defined.

In order to illustrate the technical solutions described in the present application, detailed descriptions are given below in combination with accompany drawings and embodiments.

As shown in FIG. 1, a circuit for generating a protection signal provided by an embodiment of the present application comprises: a first flip flop 10, a second flip flop 20, and a feedback device 30. By detecting a preset level change of an external signal F, an output level of a protection signal WP_O is determined, thereby controlling signal writing and signal reading in the chip.

The first flip flop 10 is configured for receiving an enabling signal E and an external signal F input thereto and outputting a first level according to the enabling signal E and the external signal F. The second flip flop 20 is in connection with the first flip flop 10, and is configured for outputting a protection signal WP_O according to the first level and a preset change in the external signal F. The feedback device 30 is connected between an output terminal of the second flip flop 20 and an input terminal D1 of the first flip flop 10, and is configured for outputting the enabling signal E. The external signal F is periodically changing high and low level signals, and the input enabling signal E is also a level signal.

Figure 2:
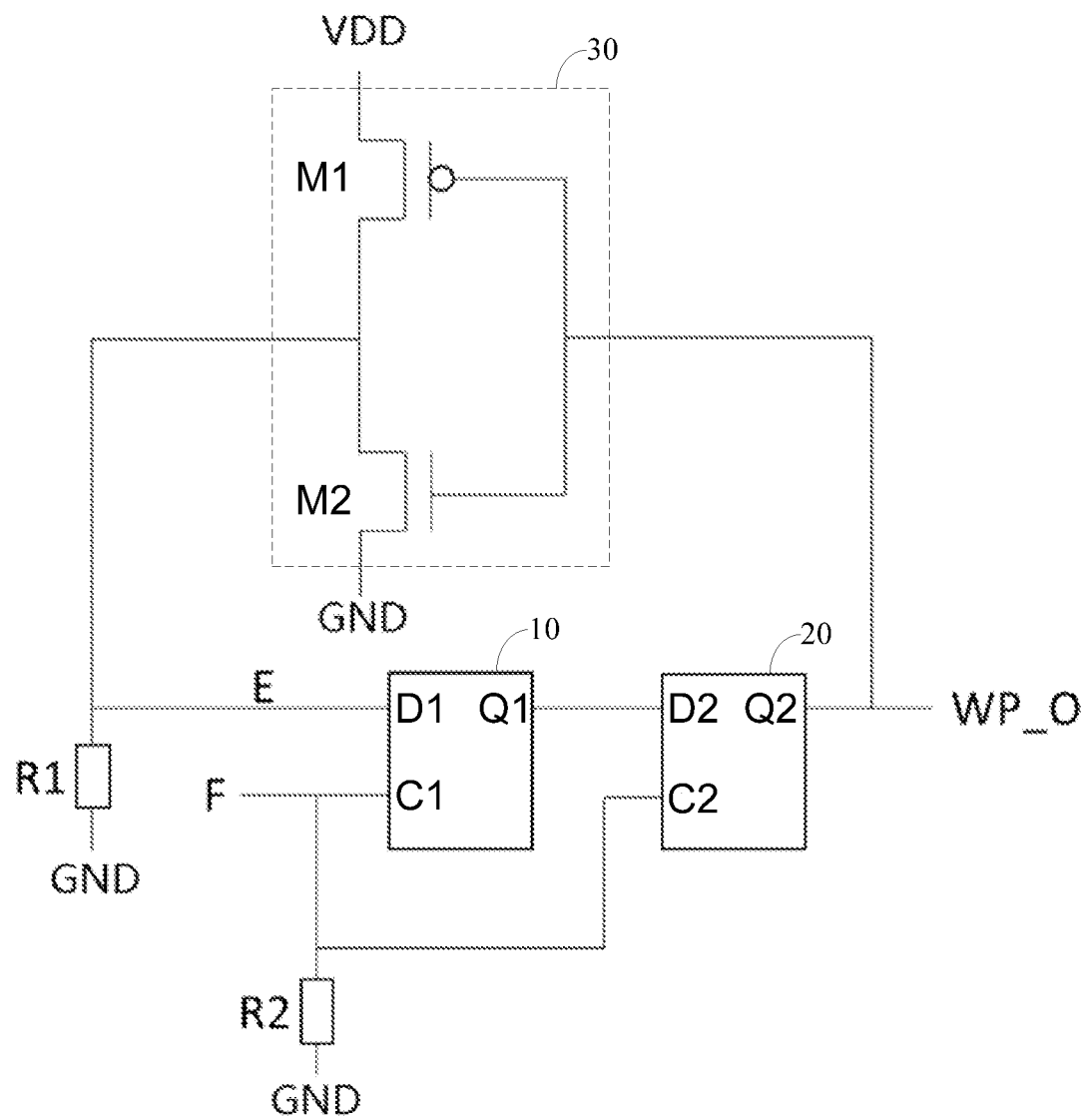
FIG. 2 is an exemplary circuit schematic diagram of a circuit for generating a protection signal provided by an embodiment of the present application.

As shown in FIG. 2, the first flip flop 10 and the second flip flop 20 are D type flip flops. An input terminal D1 of the first flip flop 10 is in connection with the output terminal of the feedback device 30 to receive the enabling signal E output from the feedback device 30, the external signal F is input into a control terminal C1 of the first flip flop 10, and an output terminal Q1 of the first flip flop 10 is in connection with an input terminal D2 of the second flip flop 20. A control terminal C2 of the second flip flop 20 is input with the external signal F, an output terminal Q2 of the second flip flop 20 outputs the protection signal WP_O, and an input terminal of the feedback device 30 is in connection with an output terminal Q2 of the second flip flop 20. The first flip flop 10 is a rising-edge-triggered D flip-flop, and the second flip flop 20 is a falling-edge-triggered D flip-flop. When the external signal F received by the control terminal C1 of the first flip flop 10 is at a rising edge, a logic level of the input terminal D1 of the first flip flop 10 is assigned to the output terminal Q1 of the first flip flop 10; and when the external signal F received by the control terminal C2 of the second flip flop 20 is at a falling edge, a logic level of the input terminal D2 of the second flip flop 20 is assigned to the output terminal Q2 of the second flip flop 20.

The feedback device 30 comprises: a first switch tube M1 and a second switch tube M2; and the first switch tube M1 and the second switch tube M2 are connected between a logic high level and a logic low level. The feedback device 30 is configured for outputting the logic high level or the logic low level according to the protection signal WP_O output by the second flip flop 20, and outputting the logic high level or logic low level as the enabling signal E to the input terminal D1 of the first flip flop 10.

The first switch tube is a P-type insulated gate field effect tube, and the second switch tube is an N-type insulated gate field effect tube, that is, the first switch tube M1 is optionally a P-type MOS tube, and the second switch tube M2 is optionally an N-type MOS tube. A source of the first switch tube M1 is in connection with the logic high level, a source of the second switch tube M2 is in connection with a logic low level, a gate of the first switch tube M1 and a gate of the second switch tube M2 are both in connection with the output terminal Q2 of the second flip flop 20, a drain of the first switch tube M1 and a drain of the second switch tube M2 are both in connection with the input terminal D1 of the first flip flop 10. The output of the feedback device 30 is determined by the signal output from the output terminal Q2 of the second flip flop 20 to the gate of the first switch tube M1 and to the gate of the second switch tube M2. When the output terminal Q2 of the second flip flop 20 is at the high level, the first switch tube M1 is turned on, the second switch tube M2 is turned off, and the feedback device 30 outputs the logic high level. When the output terminal Q2 of the second flip flop 20 is at the low level, the first switch tube M1 is turned off, the second switch tube M2 is turned on, and the feedback device 30 outputs the logic low level.

Optionally, the circuit for generating the protection signal further comprises: a first grounding resistor R1 and a second grounding resistor R2. The first grounding resistor R1 is connected between the input terminal D1 of the first flip flop 10 and a ground, and the second grounding resistor R2 is connected between the control terminal C1 of the first flip flop 10 and the ground. In the absence of inputting the external signal F, the input terminal D1 of the first flip flop 10 is grounded through the first grounding resistor R1 and input with the low level, and the control terminal C2 of the second flip flop 20 and the input terminal D2 of the second flip flop 20 are both grounded through the second grounding resistor R2 and input with the low level.

In practical applications, when the system is powered on, the external signal F and the enabling signal E are at logic low levels. After inputting the external signal F, when the external signal F is on the rising edge, a value of the enabling signal E input from the input terminal D1 of the first flip flop 10 is assigned by the first flip flop 10 to the output terminal Q1 of the first flip flop 10, that is, in such condition, the input terminal D2 of the second flip flop 20 is set to be at the low level. When the external signal F is at the falling edge, a value of the input terminal D2 of the second flip flop 20 is assigned by the second flip flop 20 to the output terminal Q2 of the second flip flop 20, that is, in such condition, the output terminal Q2 of the second flip flop 20 is at the low level, that is, the protection signal WP_O is at the low level. And when the output terminal Q2 of the second flip flop 20 is at the low level, the first switch tube M1 is turned on, and the second switch tube M2 is turned off, that is, the value of the enabling signal E changes from the low level to the high level. Similarly, after the value of the enabling signal E changes from the low level to the high level, when the external signal F is subject to another rising edge and another falling edge, the output terminal Q2 of the second flip flop 20 is assigned to be at the high level, that is, the protection signal WP_O is changed to the high level. And when the output terminal Q2 of the second flip flop 20 is at the high level, the first switch tube M1 is turned off, and the second switch tube M2 is turned on, that is, the value of the enabling signal E changes from the high level to the low level. The above processes are cycled.

In summary, the output level of the protection signal WP_O can be determined by calculating the number of rising and falling edges of the external signal F, and whether each chip on the PCB can be written by software is determined by judging the level of the protection signal WP_O And read. In particular, given that the input terminal of the protection signal WP_O of the chip is active at the high level, when the number of rising and falling edges is an odd number, the protection signal WP_O is at the low level, and the external signal F cannot perform software writing or reading on the chip. When the number of rising and falling edges is even, the protection signal WP_O is high, and the external signal F allows software writing or reading of the chip.

On the basis of the above-described circuit for generating a protection signal, the present application further provides a protection apparatus, which is in connection with a memory chip and which comprises: a first flip flop 10, a second flip flop 20, and a feedback device 30.

The first flip flop 10 is configured for receiving an enabling signal E and an external signal F input thereto and outputting a first level according to the enabling signal E and the external signal F. The second flip flop 20 is in connection with the first flip flop 10, and is configured for outputting a protection signal WP_O according to the first level and a preset change of the external signal F. The feedback device 30 is connected between an output terminal of the second flip flop 20 and an input terminal D1 of the first flip flop 10, and is configured for outputting the enabling signal E. The memory chip is configured for receiving the protection signal WP_O and controlling writing and reading of data according to the protection signal WP_O.

The present application further provides another embodiment of a circuit for generating a protection signal. The circuit for generating the protection signal comprises: a first flip flop 10, a second flip flop 20, and a feedback device 30.

The first flip flop 10 is configured for receiving an enabling signal E and an external signal F input thereto and outputting a first level according to the enabling signal E and the external signal F. The second flip flop 20 is in connection with the first flip flop 10, and is configured for outputting a protection signal WP_O according to the first level and a preset change of the external signal F. The feedback device 30 is connected between an output terminal of the second flip flop 20 and an input terminal D1 of the first flip flop 10, and is configured for outputting the enabling signal E. The first flip flop 10 is a rising-edge-triggered D flip-flop, and the second flip flop 20 is a falling-edge-triggered D flip-flop. When the external signal F received by the control terminal C1 of the first flip flop 10 is at a rising edge, a logic level of the input terminal D1 of the first flip flop 10 is assigned to the output terminal Q1 of the first flip flop 10; and when the external signal F received by the control terminal C2 of the second flip flop 20 is at a falling edge, a logic level of the input terminal D2 of the second flip flop 20 is assigned to the output terminal Q2 of the second flip flop 20. When the number of rising edges and falling edges of the external signal F is an even number, the protection signal WP_O is at the high level, and the external signal F allows data writing or reading.

In summary, embodiments of the present application provide a circuit for generating a protection signal. The circuit for generating the protection signal includes: the first flip flop 10, the second flip flop 20, and the feedback device 30. By detecting the preset level change of the external signal, the output level of the protection signal WP_O is determined, thereby controlling the signal writing and reading in the chip, preventing the misoperation and the external interference from changing the protection signal WP_O, and avoiding the risk of soft rewriting.

The above are only optional embodiments of the application, and are not used to limit the application. For those skilled in the art, the present application may have various modifications and changes. Any modification, equivalent replacement, improvement, etc. made within the spirit and principle of the present application shall be included in the scope of the claims of present application.

What is claimed is:

1. A circuit for generating a protection signal, comprising:
   a first flip flop, wherein the first flip flop is configured for receiving an enabling signal and an external signal input to the first flip flop and the first flip flop is configured for outputting a first level according to the enabling signal and the external signal;
   a second flip flop, wherein the second flip flop is in connection with the first flip flop and the second flip flop is configured for outputting a protection signal according to the first level and a preset change in the external signal; and
   a feedback device, wherein the feedback device is connected between an output terminal of the second flip flop and an input terminal of the first flip flop and the feedback device is configured for outputting the enabling signal.

2. The circuit for generating the protection signal according to claim 1, wherein the external signal is periodically changing high and low level signals.

3. The circuit for generating the protection signal according to claim 1, wherein the first flip flop is a rising-edge-triggered D flip-flop, and the second flip flop is a falling-edge-triggered D flip-flop;
   when the external signal received by a control terminal of the first flip flop is at a rising edge, a logic level of the input terminal of the first flip flop is assigned to an output terminal of the first flip flop; and
   when the external signal received by a control terminal of the second flip flop is at a falling edge, a logic level of an input terminal of the second flip flop is assigned to the output terminal of the second flip flop.

4. The circuit for generating the protection signal according to claim 1, wherein the feedback device comprises:
   a first switch tube and a second switch tube; and
   the first switch tube and the second switch tube are connected between a logic high level and a logic low level.

5. The circuit for generating the protection signal according to claim 4, wherein
   the first switch tube is a P-type insulated gate field effect tube, and the second switch tube is an N-type insulated gate field effect tube; and
   a source of the first switch tube is in connection with the logic high level, a source of the second switch tube is in connection with the logic low level, a gate of the first switch tube and a gate of the second switch tube are both in connection with the output terminal of the second flip flop, and a drain of the first switch tube and a drain of the second switch tube are both in connection with the input terminal of the first flip flop.

6. The circuit for generating the protection signal according to claim 1, wherein the protection signal is a level signal.

7. The circuit for generating the protection signal according to claim 1, further comprising:
   a first grounding resistor and a second grounding resistor;
   wherein the first grounding resistor is connected between the input terminal of the first flip flop and a ground, and the second grounding resistor is connected between a control terminal of the first flip flop and the ground.

8. The circuit for generating the protection signal according to claim 1, wherein the enabling signal is a level signal; and in an absence of inputting the external signal, the enabling signal is at a low level.

9. A protection apparatus, wherein the protection apparatus is in connection with a memory chip, and the protection apparatus comprises:
   a first flip flop, wherein the first flip flop is configured for receiving an enabling signal and an external signal input to the first flip flop and the first flip flop is configured for outputting a first level according to the enabling signal and the external signal;
   a second flip flop, wherein the second flip flop is in connection with the first flip flop and the second flip flop is configured for outputting a protection signal according to the first level and a preset change of the external signal; and
   a feedback device, wherein the feedback device is connected between an output terminal of the second flip flop and an input terminal of the first flip flop and the feedback device is configured for outputting the enabling signal;
   wherein the memory chip is configured for receiving the protection signal and controlling writing and reading of data according to the protection signal.

10. The protection apparatus according to claim 9, wherein the external signal is periodically changing high and low level signals.

11. The protection apparatus according to claim 9, wherein
the first flip flop is a rising-edge-triggered D flip-flop, and the second flip flop is a falling-edge-triggered D flip-flop;
when the external signal received by a control terminal of the first flip flop is at a rising edge, a logic level of the input terminal of the first flip flop is assigned to an output terminal of the first flip flop; and
when the external signal received by a control terminal of the second flip flop is at a falling edge, a logic level of an input terminal of the second flip flop is assigned to the output terminal of the second flip flop.

12. The protection apparatus according to claim 9, wherein the feedback device comprises:
a first switch tube and a second switch tube; and
the first switch tube and the second switch tube are connected between a logic high level and a logic low level.

13. The protection apparatus according to claim 12, wherein
the first switch tube is a P-type insulated gate field effect tube, and the second switch tube is an N-type insulated gate field effect tube; and
a source of the first switch tube is in connection with the logic high level, a source of the second switch tube is in connection with the logic low level, a gate of the first switch tube and a gate of the second switch tube are both in connection with the output terminal of the second flip flop, and a drain of the first switch tube and a drain of the second switch tube are both in connection with the input terminal of the first flip flop.

14. The protection apparatus according to claim 9, wherein the protection signal is a level signal.

15. The protection apparatus according to claim 9, further comprising: a first grounding resistor and a second grounding resistor; wherein the first grounding resistor is connected between the input terminal of the first flip flop and a ground, and the second grounding resistor is connected between a control terminal of the first flip flop and the ground.

16. The protection apparatus according to claim 9, wherein the enabling signal is a level signal; and in an absence of inputting the external signal, the enabling signal is at a low level.

17. A circuit for generating a protection signal, comprising:
a first flip flop, wherein the first flip flop is configured for receiving an enabling signal and an external signal input to the first flip flop and the first flip flop is configured for outputting a first level according to the enabling signal and the external signal;
a second flip flop, wherein the second flip flop is in connection with the first flip flop and the second flip flop is configured for outputting a protection signal according to the first level and a preset change of the external signal; and
a feedback device, wherein the feedback device is connected between an output terminal of the second flip flop and an input terminal of the first flip flop and the feedback device is configured for outputting the enabling signal;
wherein
the first flip flop is a rising-edge-triggered D flip-flop, and the second flip flop is a falling-edge-triggered D flip-flop;
when the external signal received by a control terminal of the first flip flop is at a rising edge, a logic level of the input terminal of the first flip flop is assigned to an output terminal of the first flip flop;
when the external signal received by a control terminal of the second flip flop is at a falling edge, a logic level of an input terminal of the second flip flop is assigned to the output terminal of the second flip flop; and
when a number of rising edges and falling edges of the external signal is an even number, the protection signal is at a high level, and the external signal allows data writing or reading.

\* \* \* \* \*